United States Patent [19]

Jannson et al.

[11] Patent Number: 5,026,131
[45] Date of Patent: Jun. 25, 1991

[54] HIGH CHANNEL DENSITY, BROAD BANDWIDTH WAVELENGTH DIVISION MULTIPLEXER WITH HIGHLY NON-UNIFORM BRAGG-LITTROW HOLOGRAPHIC GRATING

[75] Inventors: Tomasz P. Jannson; Joanna L. Jannson, both of Torrance; Christopher C. Rich, San Pedro; Behzad Moslehi, Redondo Beach, all of Calif.

[73] Assignee: Physical Optics Corporation, Torrance, Calif.

[21] Appl. No.: 435,608

[22] Filed: Nov. 13, 1989

Related U.S. Application Data

[63] Continuation-in-part of Ser. No. 158,396, Feb. 22, 1988, Pat. No. 4,926,412.

[51] Int. Cl.$^5$ .............................................. G02B 5/18
[52] U.S. Cl. ...................................... 350/3.7; 370/3; 350/96.19; 350/162.2; 350/162.21
[58] Field of Search ...................... 350/3.64, 3.7, 3.81, 350/3.82, 162.2, 162.21, 162.24, 96.19; 370/1, 3

[56] References Cited

U.S. PATENT DOCUMENTS

| | | | |
|---|---|---|---|
| 4,337,993 | 6/1982 | Kompfner | 350/3.7 |
| 4,387,955 | 6/1983 | Ludman et al. | 350/3.7 |
| 4,824,193 | 4/1989 | Maeda et al. | 350/96.19 |
| 4,834,474 | 5/1989 | George et al. | 350/3.65 |
| 4,838,630 | 6/1989 | Jannson et al. | 350/3.7 |
| 4,988,152 | 1/1991 | Wreede | 350/3.7 |

OTHER PUBLICATIONS

Jannson et al., "Solar Control Tunable Lippmann Holo-windows", *Solar Energy Materials* 14 (1986), pp. 289–297.

"Fiber-Optic Wavelength-Division Multiplexing and Demultiplexing Using Volume Holographic Gratings", Moslehi et al., *Optics Letters*, vol. 14, #19, Oct. 1989.

"Optical Demultiplexer for a Wavelength Division Multiplexing System", *Applied Optics*, vol. 18, No. 8, 15 Apr. 1979, Aoyama et al.

"Single Holographic Element Wavelength Demultiplexer", *Applied Optics*, vol. 20, No. 10, 15 May 1981.

*Primary Examiner*—Bruce Y. Arnold
*Assistant Examiner*—J. P. Ryan
*Attorney, Agent, or Firm*—Nilles & Nilles

[57] ABSTRACT

A wavelength division multiplexer/demultiplexer having optical path lengths between a fiber array and a Fourier transform lens, and between a dispersion grating and the lens equal to the focal length of the lens. The equal optical path lengths reduce losses due to angular acceptance mismatch in the multiplexer. Close orientation of the fiber array about the optical axis and the use of a holographic dispersion grating reduces other losses in the system. Multi-exposure holographic dispersion gratings enable the multiplexer/demultiplexer for extremely broad-band simultaneous transmission and reflection operation. Individual Bragg plane sets recorded in the grating are dedicated to and operate efficiently on discrete wavelength ranges. A volume Bragg vertically non-uniform holographic grating enables operation of the multiplexer or other devices that act on light waves according to wavelength over nearly the full usable 0.8–1.3 μm wavelength range.

4 Claims, 5 Drawing Sheets

HIGH CHANNEL DENSITY, BROAD BANDWIDTH WAVELENGTH DIVISION MULTIPLEXER WITH HIGHLY NON-UNIFORM BRAGG-LITTROW HOLOGRAPHIC GRATING

This application is a continuation-in-part of our prior copending related application, Ser. No. 158,396, filed Feb. 22, 1988, now U.S. Pat. No. 4,926,412 entitled "High Efficiency Wavelength Division Multiplexer With Defined Diffraction Means Positioning."

BACKGROUND OF THE INVENTION

1. Field of Use

This invention relates generally to multiplexers and demultiplexers for optical signals. More particularly, this invention relates to multiplexers and demultiplexers that combine and divide light signals on the basis of their wavelength components and highly non-uniform holographic gratings used to disperse light waves.

2. Description of the Prior Art

The performance of an optical transmission depends on the capabilities of the materials used to build the system and the overall efficiency of the optical system. The overall efficiency of the system, of course, is dependent on the efficiency of the individual components of the system. First, insertion losses of components such as couplers and of more complex components such as optical multiplexers and demultiplexers (collectively referred to herein as multiplexers unless otherwise noted) can greatly limit the efficiency of an optical transmission system. The insertion loss of a particular optical component is approximately the sum of the insertion losses of the elements that make up the optical component. The insertion loss attendant state-of-the-art wavelength division multiplexers is high, thus decreasing the efficiency of an otherwise generally efficient optical system. The individual losses that make up the total insertion loss of a wavelength division multiplexer are represented by the following loss equation: $l_t = l_d + l_g + l_a + l_f$ where $l_d$ is the dispersion loss, $l_g$ is the grating reflection loss, $l_a$ is the aberration loss, and $l_f$ is the Fresnel reflection loss. In state-of-the-art multiplexers $l_t$ easily can greatly exceed 3 dB in losses.

Each of the above individual losses can be identified with certain components or characteristics of a wavelength division multiplexer. Dispersion-broadening losses, $l_d$, are those losses due to chromatic broadening of the angular spectrum (beam spread) within the multiplexer. These losses are determined by the linewidth of the light source, wavelength separation between channels, and the relative positioning of the light sources and detectors about the optical axis of the multiplexer. Losses due to angular dispersion-broadening result because dispersion of the incoming light signal within the multiplexer causes the dispersed beam to have a larger spot size than the fiber core; thereby a portion of the light is not channeled into the output fiber. Grating losses, $l_g$, are the result of imperfections in the dispersion grating. Aberration losses, $l_a$, primarily are due to off-axial and chromatic aberration. Fresnel losses, $l_f$, primarily are due to the light signal passing through the glass-air interface on both sides of the focusing lens. State-of-the-art wavelength division multiplexers have not achieved high efficiency. The losses in nearly all of these categories are high. As a consequence, the efficiency of the optical transmission system into which they are placed is drastically reduced.

Furthermore, state-of-the-art wavelength division multiplexers cannot handle multiple wavelength ranges over a broad spectrum. State-of-the-art multiplexers are limited by the physics of single surface relief metallic gratings. Such multiplexers have uniformly achieved only low-channel density, in the range of 1–4 channels. Similarly, such multiplexers have been severely limited in bandwidth, in the range of 10–20 nm. One multiplexer component that has limited the bandwidth of multiplexers has been the diffraction grating. State of the art surface relief gratings, and even Bragg holographic gratings and mirrors, have severely limited bandwidths. Given that the desired, usable bandwidth range is 0.8–1.3 μm, about 500 nm in width, it can be seen that there is a great need for a broad band, high channel density multiplexer as well as one that is highly efficient.

SUMMARY OF THE INVENTION

A high efficiency, high density broadband wavelength division multiplexer is provided. Specifically, a wavelength division multiplexer employing optimally grouped input and output fiber optics, a Fourier transform (imaging) lens, and a holographic dispersion grating mounted at Littrow configuration in paraxial alignment is presented. Light waves enter and exit the wavelength division multiplexer in optical fibers. The optical axis of the wavelength division multiplexer extends through the center of the fiber optics grouping, the Fourier transform lens, and the holographic dispersion grating. In a demultiplexer embodiment, the input fiber lies in a vertical plane extending through the optical axis, and the output fibers are symmetrically spaced maximally close to the optical axis. The Fourier transform lens has a focal length f. The lens is positioned between the fiber end face and the center of the grating, such that each is located at the respective focal plane of the Fourier transform lens (the "f—f" distance relationship). The holographic dispersion grating, comprised of a set of Bragg planes formed by the interference of two light waves, is roughly one-third more efficient than metallic blazed gratings. A highly non-uniform Bragg-Littrow volume holographic grating enables operation of the multiplexer over the entire usable 500 nm (0.8–1.3 μm) bandwidth and operation in a large number of discrete spectral windows.

The total insertion loss of a wavelength division multiplexer in accordance with the present invention is between 1 and 2 dB, which is highly efficient. High efficiency unexpectedly is the result of the "f—f" distance relationship between the ends of the fiber optics, the Fourier transform lens, and the holographic grating. The maximally close orientation of the fiber optics about the optical axis, and the capabilities of the holographic dispersion grating arranged in a paraxial transmission optics system also contribute to the high efficiency.

In a further embodiment of the invention, multi-exposure holographic dispersion gratings made non-uniform in the vertical direction by state-of-the-art recording techniques, are dedicated to specific, limited ranges of wavelengths so that high operational efficiency for each wavelength range during multiplexing is unexpectedly maintained. Dedicating recorded Bragg plane sets to discrete wavelength ranges provides extremely broad overall wavelength capability without sacrificing efficiency as in conventional wavelength division multiplexers.

BRIEF DESCRIPTION OF THE DRAWINGS

FIG. 4 is a schematic of the relative orientation of fiber optics, a Fourier transform lens, and a holographic dispersion grating in accordance with FIG. 1;

FIGS. 6(a) and (b) are schematics showing, in directional cosine space, the fiber acceptance cone of ray distribution and the mismatched distribution due to non f—f configuration in a wavelength division multiplexer, respectively;

BRIEF DESCRIPTION OF THE PREFERRED EMBODIMENTS

Figure 1:
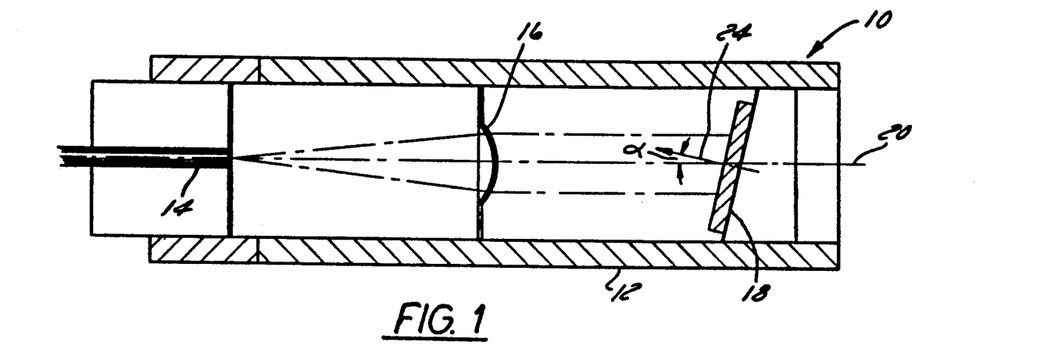
FIG. 1 is a schematic illustration of a wavelength division multiplexer in accordance with the present invention mounted in a housing.

Referring to FIG. 1, the numeral 10 designates a wavelength division multiplexer, contained in a housing 12, comprising fiber optics 14, Fourier transform lens 16, and a holographic dispersion grating 18. The housing 12 is compact, rugged, and serves to maintain the relative positioning and alignment of the fiber optics 14, lens 16, and dispersion grating 18, along optical axis 20.

The fiber optics 14 are those used primarily for optical telecommunication, and have minimal cladding diameter. The fibers are closely grouped about the optical axis 20. The Fourier transform lens 16 has a Fourier transformer focal length f. The lens is positioned within the housing 12 a distance f from the ends of the fiber optics 14. The lens 12 is centered on the optical axis 20. Of course, the lens is designed for minimizing aberrations. The dispersion grating 18 is a high efficiency holographic element made of a material which can be made highly nonuniform. Dichromated gelatin is used in the preferred embodiment but any other materials having the potential for high nonuniformity may be used also. As more fully explained infra, the holographic grating can be made non-uniform in the vertical direction, thereby greatly expanding the bandwidth of the multiplexer. The dispersion grating 18 is in a Littrow configuration with respect to the lens 16.

Figure 2A:
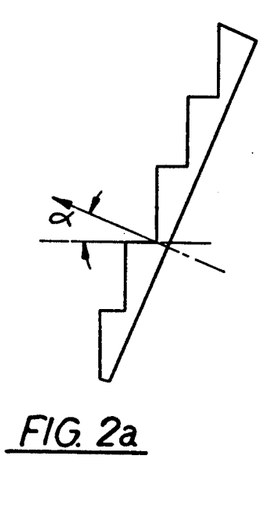
FIGS. 2(a) and (b) respectively provide a schematic of a blazed dispersion grating and a holographic dispersion grating.
Figure 2B:
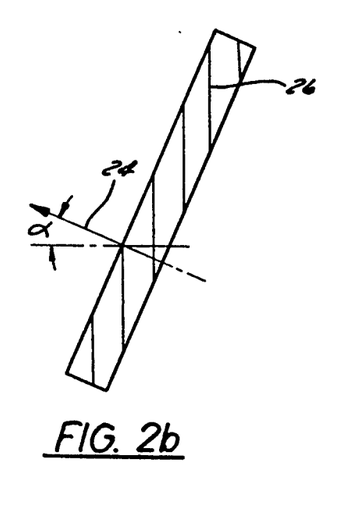

A grating normal 24 on the dispersion grating 18 forms an angle $\alpha$ with respect to the normal of the lens 16 mounted in the Littrow configuration. Grating normal 24 defines the vertical direction with respect to dispersion grating 18. As best seen in FIG. 2, the Bragg planes 26 in the dispersion grating 18 are normal to the optical axis 20 (or more accurately, to the Fresnel refracted ray along the optical axis). This holds true for either the blazed grating in FIG. 2a or the holographic grating in FIG. 2b. The angle $\alpha$ can be seen in both of these figures.

Figure 3:
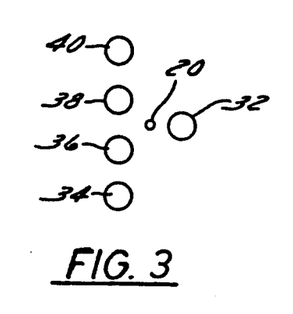
FIG. 3 is a schematic of the fiber bundle as viewed from the holographic dispersion grating along the optical axis.

Referring to FIG. 3, the configuration of the fibers 14 can be seen as viewed from the dispersion grating 18 along the optical axis 20. The input fiber designated 32 is located in a horizontal plane extending through the optical axis 20. Most importantly, the input fiber 32 is located immediately adjacent the optical axis. The output fibers designated 34, 36, 38, 40 are grouped as closely as possible about the optical axis 20. Furthermore, the optical fibers lie in a plane normal to the horizontal plane extending through the optical axis. The output fibers 34, 36, 38, 40 are symmetrically situated about the optical axis and the input fiber 32. In other words, there are an equal number of output fibers on either side of the horizontal plane extending through the optical axis 20.

Figures 4, 6A, 6B:
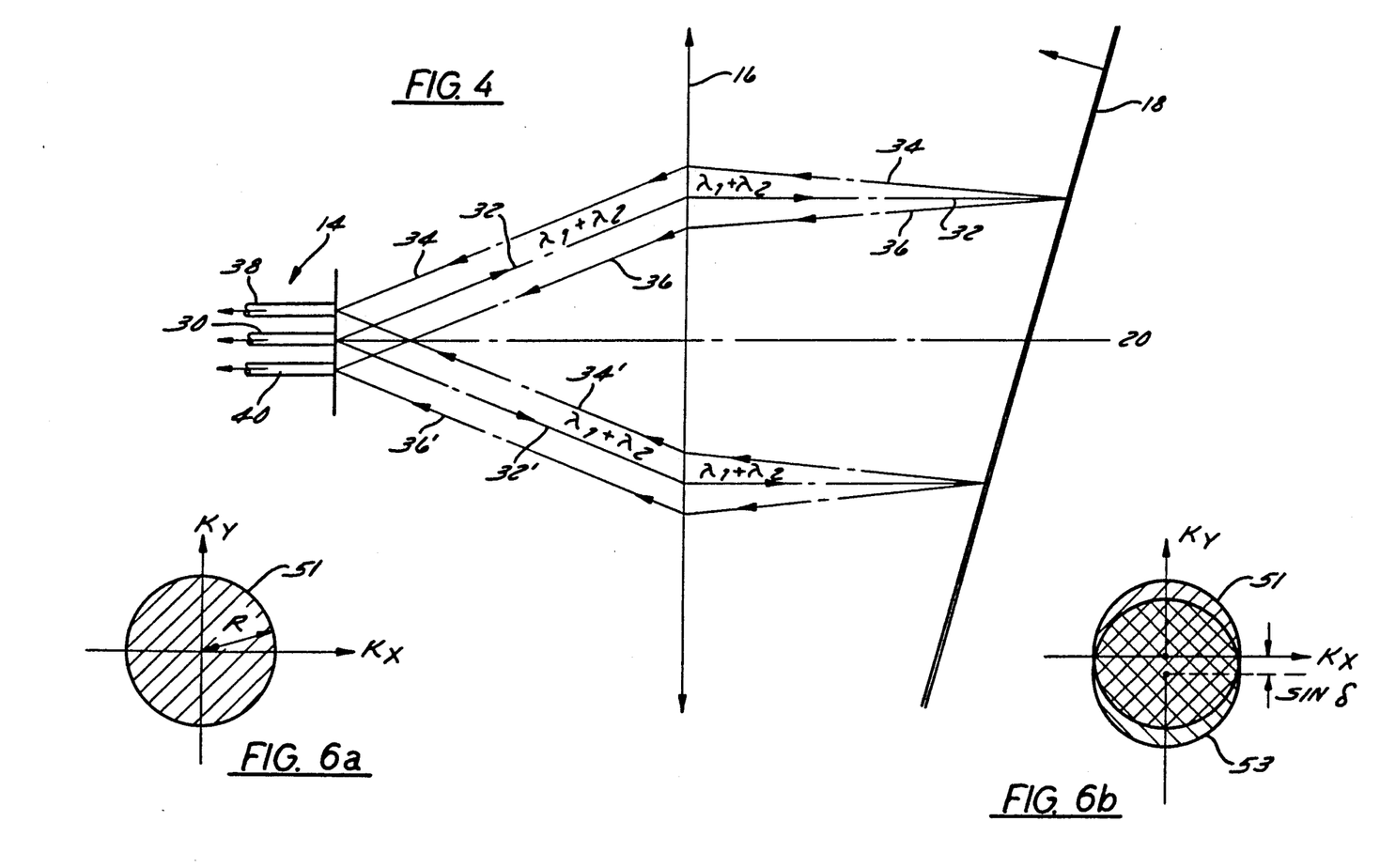

Referring now to FIG. 4, the path of two light waves of different wavelength will be traced through the wavelength division multiplexer 10. Note that while this description involves only two different wavelengths of light, the present invention is capable of wavelength division multiplexing numerous different wavelengths.

A multiplexed light signal designated $\lambda_1 + \lambda_2$ traveling along the input fiber 30 in the fiber bundle 14 reaches the end of the input fiber and enters the air-filled space (or lens block) between the fiber bundle 14 and the lens 16. As the light wave $\lambda_1 + \lambda_2$ propagates towards the lens 16, it diverges. Its envelope is denoted by the two lines labelled $\lambda_1 + \lambda_2$ having arrowheads 32 and 32' pointing to the lens 16. As the light waves $\lambda_1 + \lambda_2$ pass through the lens 16, the light waves are collimated by the lens. When the light waves $\lambda_1 + \lambda_2$, still designated 32 and 32', reach the holographic diffraction grating 18, they are diffracted. The diffraction grating diffracts the $\lambda_1$ wavelength component differently than the $\lambda_2$ wavelength component of the composite $\lambda_1 + \lambda_2$ light wave.

Referring to the $\lambda_1 + \lambda_2$ light wave designated 32, the $\lambda_1$ wavelength component is diffracted along the line designated 34, and the $\lambda_2$ wavelength component is diffracted along the line designated 36. Referring now to the $\lambda_1 + \lambda_2$ composite light wave designated 32', the $\lambda_1$ wavelength component of that wave is diffracted along the line designated 34', and the $\lambda_2$ wavelength component is diffracted along the line designated 36'. Note that each of the two diffracted $\lambda_1$ wavelength components (rays), 34 and 34', are diffracted from the holographic diffraction grating 18 parallel to each other. Similarly, the two $\lambda_2$ wavelength components, 36 and 36', are diffracted from the holographic diffraction grating parallel to each other. In fact, all light rays of the same wavelength will be diffracted off the diffraction grating virtually parallel to each other (except for the slight divergence due to finite fiber size).

The two $\lambda_1$ light rays 34 and 34' are focused by the Fourier transform lens 16 into the $\lambda_1$ output fiber designated 38. The $\lambda_2$ light rays 36 and 36' are focused into the $\lambda_2$ output fiber designated 40. The angle at which the light signals 34, 34', 36, and 36' enter their respective output fibers is $\Theta$.

Having described the paths of two light waves of different wavelength, the advantages of the structure of the present high efficiency wavelength division multiplexer invention can be detailed. Referring again to the equation $l_t=l_d+l_g+l_a+l_f$, one of the more important losses, $l_d$, losses due to dispersion of the light beams as they propagate through the multiplexer, is examined.

Figure 5:
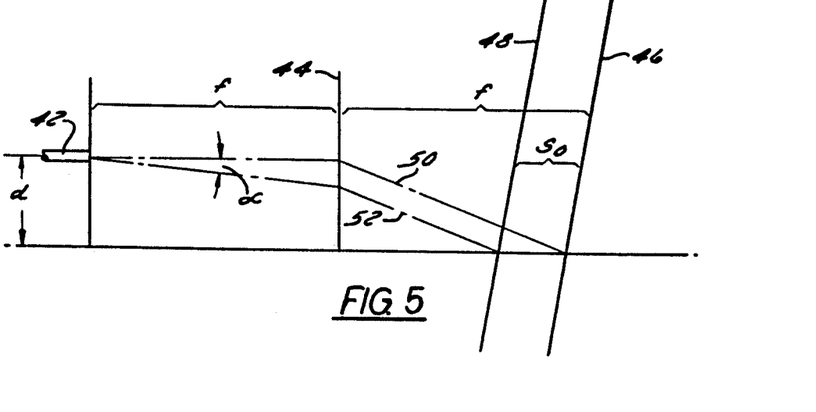
FIG. 5 is a schematic of a wavelength division multiplexer illustrating variations in the positioning of the holographic dispersion grating.

Referring to FIG. 5, the fundamental relationships representing the loss $l_d$ will be explained. As will be seen herein, the losses $l_d$ are minimized by the f—f distance relationship between the paraxially positioned fiber optics 14, the Fourier transform lens 16, and the holographic dispersion grating 18. In FIG. 5, the end of fiber 42 is spaced the distance f from a Fourier transform lens 44. The mid-point of a holographic grating 46 is in turn located a distance f from the lens 44. The holographic grating 48 is located a distance less than f from the lens 44. The distance between the holographic grating 46 and holographic grating 48 is $S_o$. A light ray 50 is shown diffracted from the holographic grating 46 and focused by the lens 44 into the fiber 42. The light ray 50 is the center ray of the light beam entering fiber 42 from the grating 46. A light ray 52 is shown diffracted from the holographic dispersion grating 48 through the lens 44 into the fiber 42. The light ray 52 is the center ray of the light beam entering fiber 42 from the grating 48. The difference in the angles between light rays 50 and 52 as they enter the fiber 42 is designated δ.

The angular acceptance cone angle, C (in air), entering the fiber 42 is defined as:

$$C = 2.\sin^{-1}(NA) \quad (1)$$

where NA is the numerical aperture of the fiber 42. For example, a typical fiber with NA=0.2 would have an acceptance cone angle C=23.07 degrees or 0.403 radians. This cone of light rays can be represented as a circular area 51 of radius R=NA in the "k-space" diagram as illustrated in FIG. 6a. Taking the Z-axis to be the optical axis, $K_x$ and $K_y$ are the x and y directional cosines of the rays. Referring again to FIG. 5, the light beam reflected from the grating 46 located at f from the lens with center ray 50, would have a ray distribution as illustrated in FIG. 6a if the lens 44 is perfect (free of aberrations). However, the light beam reflected from the grating 48, located at $f-S_o$ from the lens with center ray 52, would have a similar ray distribution but the center of the circular area 53 is slightly shifted in the $K_y$ axis by an amount equal to sin δ as illustrated in FIG. 6b. Since the fiber accepts only those light rays that are within the circular area 51, part of the light beam received from dispersion grating 48 is obviously lost. The acceptance ratio, E, can be calculated from the area of overlap between the two circular areas 51 and 53 as follows:

$$E = \frac{2}{\pi} [\phi - \sin\phi\cos\phi] \quad (2)$$

where $\phi = \cos^{-1} \frac{\sin\delta}{2\ NA}$ in radians. $\quad (3)$

From FIG. 5 it is evident that $$\tan\delta = \frac{S_o}{f}\ \frac{d}{f} \quad (4)$$

where d is the distance of the fiber from the optical axis. Thus, the location of the grating is more critical for a higher number of multiplexing channels because d, and thus δ, increases with the number of channels. As a result of the f—f relationship structure disclosed herein, the number of channels that can be multiplexed is larger (more than 16 channels) than state-of-the-art multiplexing means.

The next loss indicated in the loss equation is $l_g$. The grating losses $l_g$ for an ideal grating are zero, i.e., the no loss case. Imperfections in the grating yield $l_g > 0$. Other losses result in $l_g > 0$. For instance, in any grating, there will be some light waves that are not diffracted by the grating. Some of the light waves pass through the grating and are lost. Aberration losses, represented by $l_a$ in the loss equation, are reduced to a minimum in the present invention because the invention utilizes transmission imaging optics arranged paraxially. Transmission imaging optics systems do not use mirrors which inherently have high aberration. The paraxial nature of the multiplexer disclosed herein maintains the fiber optics maximally close to the optical axis. This type of paraxial system is not possible with a multiplexer using a reflective optics system. Lastly, Fresnel losses, represented by $l_f$ in the loss equation, can be minimized by antireflective coatings on the lens and therefore are considered to be zero.

All of the losses represented by the loss equation $l_t = l_d + l_g + l_a + l_f$ are minimized as a direct result of the fact that the present multiplexer utilizes transmission optics, is paraxial, utilizes a holographic volume grating, and maintains the f—f distance relationship between the fibers, the Fourier transform lens, and the holographic dispersion grating.

Figure 7:
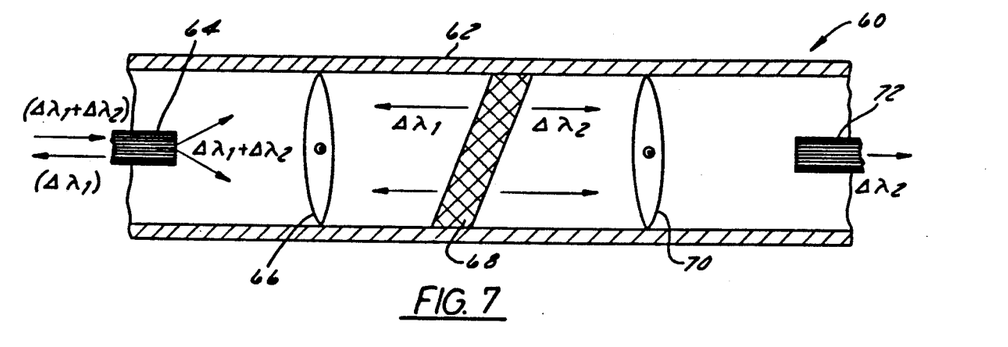
FIG. 7 illustrates a transmission and reflection multi-exposure holographic wavelength division multiplexer in accordance with the present invention.

In further embodiments of the invention, the f—f distance relationship and the paraxial structure of the wavelength division multiplexer disclosed herein can provide a low loss optical wavelength dependent system. In FIG. 7, the f—f distance relationship is used in a combined reflection and transmission multi-exposure holographic wavelength division multiplexer. The multiplexer generally designated 60 comprises a standard housing 62, fiber optic bundle 64, lens 66, multi-exposure dispersion grating 68, lens 70, and, finally, fiber optic bundle 72. The housing 62 is standard and serves to maintain the relative positioning and alignment of the components housed therein.

The optical fibers in the bundle 64 are in the standard arrangement shown in FIG. 3. The lenses 66 and 70 may have aspherical surfaces and are corrected for chromatic aberration. The dispersion grating 68 is holographic and is recorded with one set of Bragg planes for reflection and one set for transmission. The reflection Bragg plane set reflects the range of wavelengths $\Delta\lambda_1 = \{\lambda_1, \lambda_2, \ldots \lambda_n\}$ back toward the lens 66 and fiber bundle 64. The dispersion grating 68 diffracts each of the wavelengths in the range $\{\lambda_1, \lambda_2, \ldots \lambda_n\}$ differently, and the reflected light waves are focused into their respective output fibers by the lens 66. The dispersion grating 68 transmits all wavelengths outside the $\Delta\lambda_1$ band. In other words, the wavelengths outside that range pass through the dispersion grating 68 unaffected by the reflection Bragg plane set recorded therein.

The transmitted range of wavelengths, $\Delta\lambda_2 = \{\lambda_{(n+1)}, \lambda_{(n+2)}, \ldots \lambda_s\}$, are diffracted by a second set of Bragg planes recorded in the dispersion grating 68. Each of the diffracted light waves in the range $\{\lambda_{(n+1)}, \lambda_{(n+2)}, \ldots \lambda_s\}$ are diffracted differently by the dispersion grating 68. Each of the transmitted wavelengths is focused by the lens 70 into its respective output fiber in the fiber bundle 72. The lens 70 and fiber bundle 72 are similar in structure to fiber bundle 64 and lens 66.

The ability to reflect and transmit the multiplexed light signal in the wavelength division multiplexer disclosed herein with extremely low loss greatly expands the usefulness and operational spectrum, heretofore unattainable, of the multiplexer. Because of the use of multi-exposure holographic gratings each dedicated to a separate range of wavelengths, the invention can operate on an extremely broad wavelength range of light signals. Furthermore, it can operate on each of those wavelength ranges highly efficiently.

Continuing with FIG. 7, the distance between the end of the fiber bundle 64 and the lens 66 is f. The distance between the lens 66 and the dispersion grating 68 is also f so that the reflection portion of the wavelength division multiplexer satisfies the low loss f—f relationship. Likewise, the transmission portion of the wavelength division multiplexer also closely satisfies the f—f relationship and thus is of equally low loss. In other words, the distance between the lens 70 and the fiber bundle 72 is set so that the fiber bundle 72 collects the maximum amount of light collimated by the lens 70. As seen in the above treatment of the fundamental wavelength division mutliplexer and analysis of the relationships and equations applicable thereto, the losses minimized by the f—f relationship and the Littrow configuration are the losses due to dispersion broadening, $l_d$, in the loss equation. Furthermore, because there is only one dispersion grating that performs both the reflection and transmission functions, the grating losses, $l_g$, in the loss equation, are also minimized. At the same time, though, the flexibility of the wavelength division multiplexer is greatly increased because of the ability to reflect one wavelength range of the demultiplexed signals while transmitting another range of demultiplexed signals into a separate fiber bundle.

Figures 8, 9:
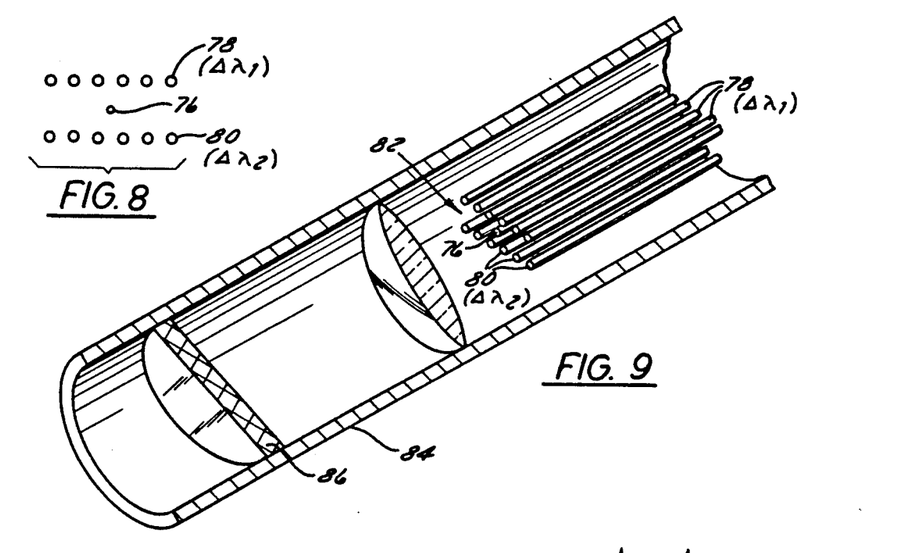
FIG. 8 illustrates the orientation of a fiber bundle in accordance with FIG. 9.
FIG. 9 is a schematic of a multi-exposure reflection wavelength division multiplexer in accordance with the present invention.

Numerous embodiments of the invention are possible by varying the number of Bragg plane sets recorded in the dispersion grating and the set-up of the fiber bundle. For instance, the fiber bundle set-up shown in FIG. 8 enables a double reflection multi-exposure wavelength division mutliplexer. In FIG. 8, the source fiber 76 is located directly on the optical axis. Two sets of output fibers, designated 78 and 80, are situated on either side of the source fiber 76. Each set of output fibers is situated normal to a vertical plane extending through the optical axis.

Referring to FIG. 9, a wavelength division multiplexer employing the fiber bundle set up of FIG. 8 and a double reflective multi-exposure dispersion grating is shown. The fiber bundle, generally designated 82, is shown in housing 84 also containing the dispersion grating 86. The dispersion grating 86 is recorded with two different Bragg plane sets each responsive to a separate range of wavelengths. One of the Bragg plane sets, for instance, responsive to wavelengths $\Delta \lambda_1 = \{\lambda_1, \lambda_2, \ldots \lambda_n\}$, diffracts the light waves received from the source fiber 76 into the output fiber bundle 78. The other Bragg plane set recorded in the dispersion grating 86 diffracts the band of light waves $\Delta \lambda_2 = \{\lambda_{(n+1)} + \lambda_{(n+2)} + \ldots \lambda_s\}$ coming from the source fiber 76 to the fiber bundle 80. The lens 88, as before, performs the function of collimating the source beam coming from the source fiber 76 onto the dispersion grating 86. Lens 88 also serves the function of focusing the light waves diffracted from the dispersion grating 86 into the respective fiber bundles 78 and 80. It is apparent that the wavelength division multiplexer embodiment shown in FIG. 9 can be used in cases where an extremely wide range of wavelengths is in use, or, where the signal from the source fiber 76 must be demultiplexed into many different light signals for many different discrete channels.

The wavelength division multiplexer can employ a multi-exposure reflection and transmission dispersion grating. In this way, not only can the wavelength division multiplexer disclosed herein reflect one range of wavelengths and transmit another range of wavelengths, or reflect two ranges of wavelengths, it can both reflect and transmit two or more different ranges of wavelengths. It is apparent that a large number of permutations of fiber bundle set-up and dispersion grating recordings can be employed to meet the needs of almost any optical multiplexing/demultiplexing system. Moreover, because each of these embodiments can employ the advantageous f—f relationship in combination with paraxial optics, the losses in each of the embodiments will be lower than state-of-the-art wavelength division multiplexers.

The diffraction grating of the present invention is a highly non-uniform Bragg-Littrow volume holographic grating with vertical grating constant non-uniformity. The vertical non-uniformity of this holographic grating unexpectedly enables operation over 10 to 20 times the bandwidth enabled by state-of-the-art multiplexers using other types of diffraction gratings. The recent article by Moslehi, et al., "Fiber Optic Wavelength-Division Multiplexing and Demultiplexing Using Volume Holographic Gratings," Optics Letters 14, 1088 (1989), incorporated by reference herein, emphasizes a broadband WDM system in which the present invention can be used to obtain previously unobtainable bandwidths. Known diffraction gratings include phase-relief gratings as in Carter, U.K. patent No. 2,086,168, or digital phase gratings such as in Dammann U.S. Pat. No. 4,748,614 or holographic lenses and holographic optical elements as in Rugman et al., U.S. Pat. No. 4,387,955, or holographic gratings in Rowland circle geometry as in Bittner, U.S. Pat. No. 4,707,056. State-of-the-art diffraction gratings also include cascaded Lippmann-Bragg holographic gratings such as in D'Auria et al. U.S. Pat. No. 3,953,727 and Lizet et al., U.S. Pat. No. 4,740,951. An overview of multimode wavelength division multiplexers (WDM) is presented in W. Tomlinson, Wavelength Multiplexing in Multimode Optical Fibers, Applied Optics Vol. 16, No. 8 (1977).

A brief explanation of the various types of holographic gratings is appropriate so that the distinctions between them can be appreciated. First, gratings can be either holographic or non-holographic. Holographic gratings can be either phase relief or Bragg volume gratings. Phase relief gratings diffract from a metallized surface. Bragg volume gratings are based on volume diffraction-scattering, i.e., the light beam is reflected from a Bragg plane located in the volume.

Bragg volume gratings are further subdivided into Lippmann and slanted gratings. Lippmann gratings have Bragg planes parallel to the surface of the hologram and thus do not disperse light waves, i.e., the angle of reflection is always equal to the angle of incidence, independent of wavelength. They can only perform two-beam multiplexing unless cascaded. Slanted gratings have Bragg planes that are not parallel to the surface of the hologram. Thus, they produce wavelength-chromatic dispersion; the angle of diffraction is dependent upon wavelength and can produce multichannel multiplexing.

Holographic gratings can be divided in another way, into transmission and reflection gratings. Transmission gratings can be either symmetric or non-symmetric and they can either be thin or thick (volume holograms).

Volume holographic gratings, either transmission or reflection, have higher diffraction efficiency than thin holograms and can be either uniform or non-uniform. The non-uniformity can be either in the horizontal or the vertical direction or both. Fully uniform gratings (uniform in both the vertical and the horizontal directions) are well known in the art and various examples of them can be seen in FIGS. 10a through e. The parallel lines in these figures represent Bragg planes recorded in the hologram according to state of the art techniques.

Figure 10A:
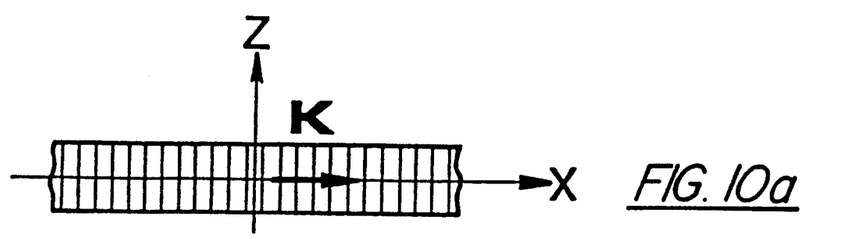
FIG. 10 is a schematic of various holographic gratings, fully uniform (a)-(e) and non-uniform (f)-(k)
Figure 10B:
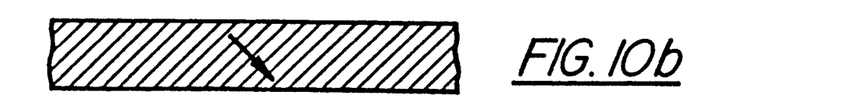
Figure 10C:
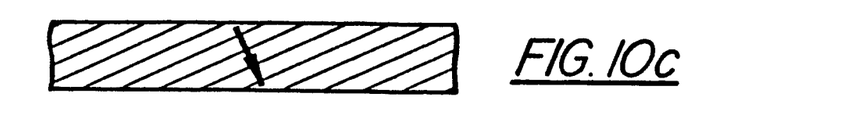
Figure 10D:
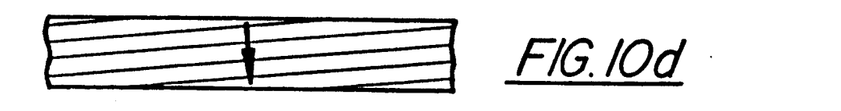
Figure 10E:
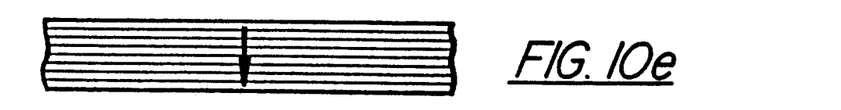

FIG. 10a is a symmetrical transmission holographic grating that is fully uniform. FIG. 10b is a slanted transmission holographic grating that is fully uniform. FIG. 10c is a fully uniform holographic grating that both reflects and transmits incident light waves. FIG. 10d is a slanted reflection holographic grating that is fully uniform. FIG. 10e is a reflection Lippmann holographic grating that is fully uniform.

Figure 10F:
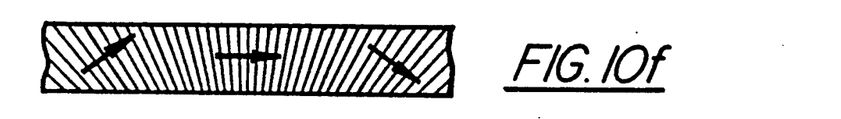
Figure 10G:
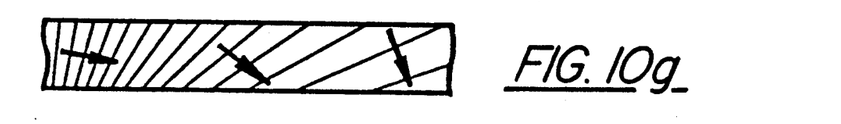
Figure 10H:
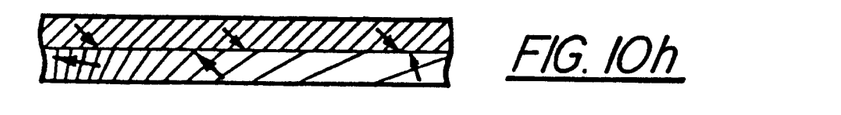
Figure 10I:
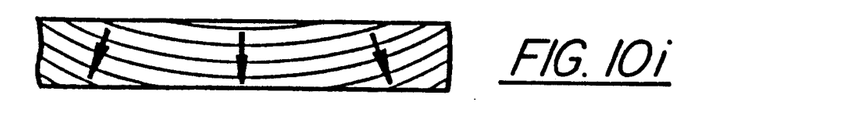

Horizontally non-uniform holographic gratings are also known in the art. Non-uniformities in the horizontal direction can focus, image, and wavelength disperse incident light beams. The degree of horizontal non-uniformity is determined by the horizontal grating constant. Examples of horizontally non-uniform holographic gratings can be seen in FIGS. 10f through i. FIG. 10f represents an on-axial transmission holographic grating that concentrates light rays due to its horizontal non-uniformity. FIG. 10g is an example of an off-axial transmission holographic grating that concentrates light rays due to its horizontal non-uniformity. FIG. 10h is an example of a compound on-axial transmission holographic grating that concentrates incident light rays. FIG. 10i is an example of an on-axial reflection holographic grating that concentrates light rays in the reflection direction due to its horizontal non-uniformity. Common names for horizontally non-uniform holographic gratings are holographic optical elements or HOE's. State-of-the-art HOE's are described in R. Collier, et al., Optical Holography, Academic Press (1971). Fully uniform holographic gratings, which follow the well known Kogelnik theory, are, of course, well known, too.

None of the state-of-the-art holographic gratings (nor any of the non-holographic gratings) introduced above enable operation at extremely large bandwidth (about 300 nm). The vertically non-uniform volume holographic grating of the present invention made of dichromated gelatin can enable such broad band operation. The present invention combines the broad band capabilities of a non-Bragg holographic grating with the high diffraction efficiency of a Bragg holographic grating to provide a broad band high efficiency hologram.

Literature discussing the theory of holographic gratings with vertical non-uniformity is not abundant. So-called chirped gratings used in integrated optics, are discussed in the literature. These gratings, however, are 2D gratings, not 3D gratings, because they deal with the propagation of planar (2D) guided waves and not 3D waves. There are no known literature discussing 3D vertically non-uniform gratings.

J. Jannson, et al., Solar Control Tunable Lippmann Holowindows, Solar Energy Materials, 14, 189 (1986), gives the approximate formula for spectral bandwidth for the Lippmann case at normal incidence, or the Bragg bandwidth for vertically non-uniform gratings. This paper discusses the spectral bandwidth formula in the context of holographic films to reflect infrared and UV rays on windows.

The formula for the spectral bandwidth for vertical non-uniformity is $$\frac{\Delta\lambda}{\lambda} = \frac{\Delta n}{n} + \frac{\Delta\Lambda}{\Lambda} \qquad \text{Eq. 1}$$

where $\Delta\lambda$ is the resulting bandwidth, $\lambda$ is the average wavelength, n is the refractive index, $\Delta n$ is the refractive index modulation, $\Lambda$ is the average grating constant, and $\Delta\Lambda$ is the grating constant change. The first term on the right side of the equation represents the contribution of the grating to the extent that it is vertically uniform while the second term on the right side of the equation represents the non-uniform contribution. Applying the equation to a fully uniform holographic grating as discussed above, i.e., a grating that would satisfy Kogelnik's theory, the second term on the right side of the equation, $$\frac{\Delta\Lambda}{\Lambda},$$

would be equal to zero.

Figure 11:
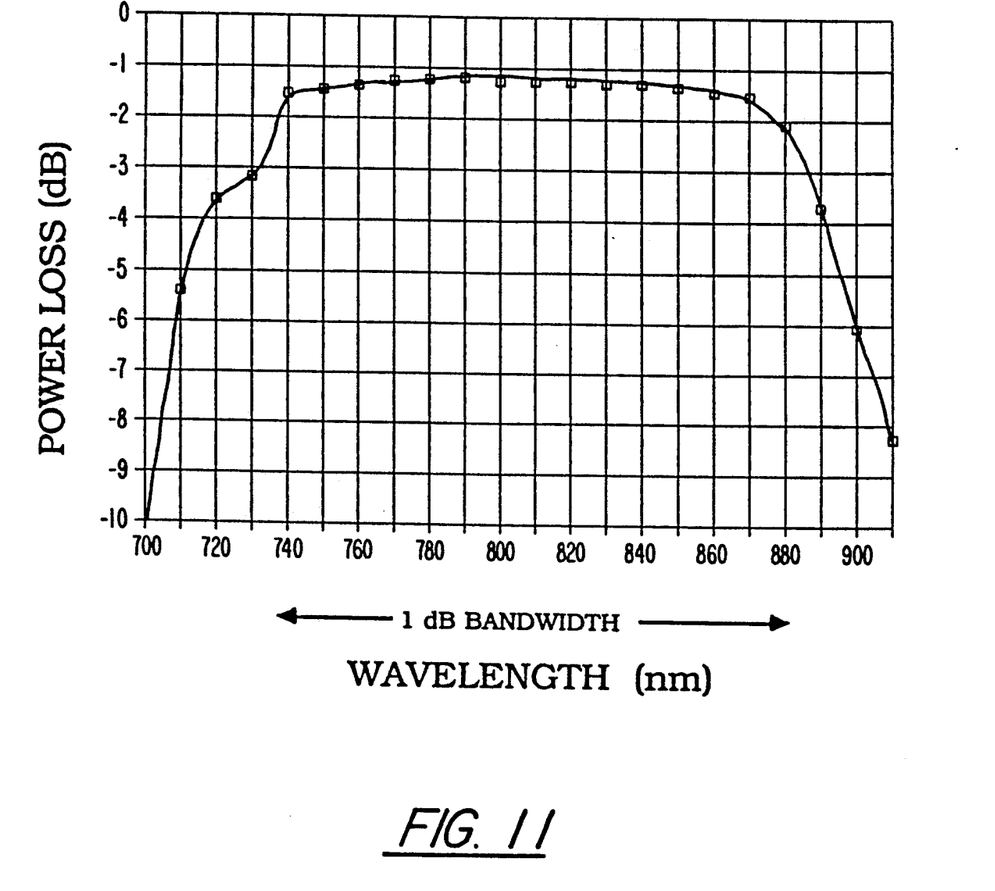
FIG. 11 is a graph illustrating the bandwidth obtainable with the present invention.

Taking a highly efficient grating with, for example, a 20-micron thickness, leads to a bandwidth of 20 nm. If the holographic grating is made vertically non-uniform by changing the change of the grating constant by 10%, a 100-nm bandwidth can be obtained for a 20-micron thick grating and a 1-micron wavelength beam. It can be seen from this example that vertical non-uniformity has a drastic effect on spectral (Bragg) bandwidth and wavelength Bragg selectivity. Increasing the percent of vertical change of the grating constant can lead to a hologram that has between 100–500 nm bandwidth in the vicinity of 1 micron wavelength as shown in FIG. 11. Thus, a holographic grating of this type used in a WDM can result in at least a 10-channel operating capability, taking into account the limitations of LED light sources and the requisite wavelength separation between the channels. A holographic grating of this type used in any device which acts on light waves according to wavelength will result in improved performance.

Dichromated gelatin (DCG) or DCG-polymer grafts, are especially suited to the manufacture of a vertically non-uniform holographic grating. In contrast to blended compositions, which are mixed mechanically, a graft is the chemical combination of DCG and polymers such as PVA or PMMA on the molecular level which achieves the advantages of both natural and artificial polymers. As is well known in the art, DCG holograms can be made highly non-uniform by highly non-uniform chemical processing of the holograms after exposure. The manufacture of volume holograms in accordance with the present invention involves three steps: coating, exposing, and processing of a gelatin preferably having a Bloom hardness of between 250–300 units and a water/gelatin/ammonium dichromate ratio (by weight) of 200–500/25–95/2–50 grams. Each of the three processing steps affects the nonuniformity of the hologram.

Coating, which may be carried out by spinning in the preferred embodiment, contributes to nonuniformity because the gelatin hardening process occurs from the surface of the gelatin inwardly. As a hard surface layer begins to form on the gelatin, evaporation is retarded, leaving the deeper more inward layers of gelatin moister and softer than the surface gelatin. Exposure contributes to nonuniformity because light incident the gelatin is absorbed as it penetrates the gelatin volume. The gelatin of the preferred embodiment may be exposed to between 200–600 mJ/cm2 of Argon laser light. The areas of the gelatin that receive the strongest light harden the most (because cross-linking is greatest in those areas); the inner portions of the gelatin remain softer. Processing contributes to nonuniformity by amplifying the effects of the previous two processing steps and by dehydrating the gelatin. Processing involves fixing and then dehydration in alcohol-water baths. The preferred fixing time is between 15–45 seconds in Kodak fixer. The water-alcohol bath treatment commonly used to process DCG holograms is described fully in Collier, supra and the preferred bathing sequence may involve a series of baths the first of which is pure water for a duration of 1–4 minutes. Subsequent baths of shorter duration containing alcohol and water follow, with the alcohol to water ratio increasing from bath to bath. The final bath is pure alcohol. The manufacturing process in Chang and Leonard, *Appl. Opt.* 18, 2407 (1979), incorporated by reference herein, generally describes the above processes. In short, all of the processing steps contribute to vertical nonuniformity by regional swelling and shrinking of the gelatin thus altering the vertical distance between the already recorded Bragg planes close to the surface with respect to those Bragg planes that are farther from the surface.

In addition to providing extremely broad and heretofore unobtainable bandwidths, volume holographic gratings have a number of other advantages over, for instance, surface gratings. These advantages include low contamination sensitivity and low sensitivity to polarization. In contrast to surface metallized diffraction gratings, both the TE (electric vector perpendicular to the plane of incidence) and TM (electric vector perpendicular to the plane of incidence) polarization components have roughly the same diffraction efficiency. In metallized gratings the TM polarization has a much lower (e.g., 20%) diffraction efficiency than the TE polarization, and higher diffraction orders can, in addition, suppress the diffraction efficiency.

Figure 10J:
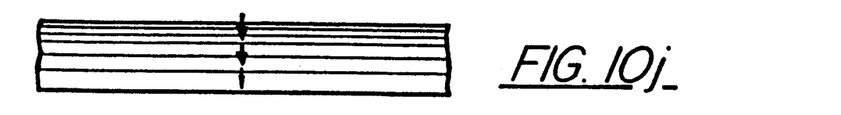
Figure 10K:
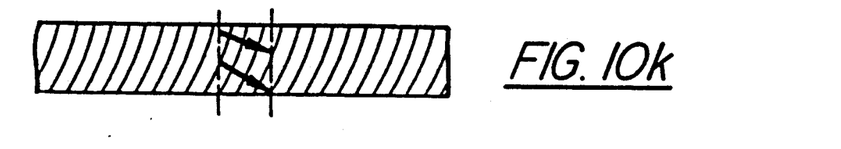

Examples of vertically non-uniform holographic gratings can be seen in FIGS. 10*j* and *k*. FIG. 10*j* shows a Lippmann (Bragg planes parallel to the surface) holographic grating having a vertical non-uniformity. FIG. 10*k* shows a slanted transmission holographic grating with vertical non-uniformity. In contrast to the horizontally non-uniform gratings, the vertically non-uniform gratings shown in FIGS. 10*j* and 10*k* have Bragg planes that are non-uniformly spaced in the direction of the grating normal with respect to the surface of the hologram (i.e., the vertical direction) produce no focusing or imaging or wavelength dispersion effect but rather affect only the spectral bandwidth or the wavelength Bragg selectivity of the holographic grating.

In accordance with the earlier discussion relating to the use of a multi-exposure, reflection and transmission holographic grating in the multiplexer of the present invention, the highly non-uniform holographic grating can improve the bandwidth of each of the recorded spectral windows dedicated to a separate range of wavelengths. Using the vertically non-uniform grating of the present invention, each of the spectral windows independently recorded in the DCG hologram used in the disclosed multiplexer can be enlarged in bandwidth many times. Similarly, the total bandwidth covered by the recorded Bragg plane sets can be increased many times as well. Thus, not only can many spectral windows covering discrete wavelength ranges be recorded, but those windows can be caused to cover large regions of the wavelength spectrum between 0.8 and 1.3 $\mu$m using the vertically non-uniform holographic grating disclosed herein.

Again, to show the extreme flexibility of a holographic grating made in a vertically non-uniform format, the spectral windows in the grating can be recorded to either transmit or reflect the wavelength falling within a window. A single grating can be recorded with a number of both transmission and reflection vertically non-uniform Bragg plane sets. The present invention clearly fills the need for a high efficiency, high channel density extremely broad band wavelength division multiplexer.

It is to be understood that embodiments not shown but that fall within the scope of the claims are fully a part of this invention.

We claim:
1. A multiplexer/demultiplexer comprising:
   an input for a light signal;
   an output;
   focusing means positioned to receive the light signal from said input;
   means for diffracting the light signal according to wavelength positioned to receive light from and reflect diffracted light to the focusing means, said focusing means focusing said diffracted light to said output, said diffracting means comprising volume holographic means having vertically nonuniform Bragg planes.

2. The device of claim 1 wherein the volume holographic means is made from DCG.

3. The device of claim 1 wherein the volume holographic means is made from DCG-polymer graft.

4. A demultiplexer comprising:
   an input for a multiplexed light signal;
   first and second outputs;
   focusing means positioned to receive the multiplexed light signal from said input;
   means for diffracting a first and second range of wavelengths in the multiplexed light signal received from the focusing means according to wavelength back toward the focusing means, said focusing means focusing said first and second range of wavelengths to said first and second outputs respectively, said diffracting means comprising volume holographic means recorded with a set of vertically nonuniform reflection Bragg planes for diffracting the first range of wavelengths and a set of vertically nonuniform reflection Bragg planes for diffracting the second range of wavelengths.

* * * * *